US 6,627,109 B2

United States Patent
Ragsdale et al.

(10) Patent No.: US 6,627,109 B2
(45) Date of Patent: Sep. 30, 2003

(54) POLYOL FORMULATIONS FOR PRODUCING ANTISCORCH POLYURETHANE SLABSTOCK FOAMS

(75) Inventors: Mark E. Ragsdale, Duncan, SC (US); Sandy G. Belue, Landrum, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/286,219

(22) Filed: Nov. 1, 2002

(65) Prior Publication Data

US 2003/0050355 A1 Mar. 13, 2003

Related U.S. Application Data

(63) Continuation of application No. 09/586,392, filed on Jun. 2, 2000, now Pat. No. 6,541,532.

(51) Int. Cl.$^7$ .................................................. C09K 3/00
(52) U.S. Cl. .............................. 252/182.24; 252/182.28
(58) Field of Search ........................ 252/182.24, 182.28

(56) References Cited

U.S. PATENT DOCUMENTS 4,757,095 A * 7/1988 Galan et al. ................. 521/128
6,348,514 B1 * 2/2002 Calabrese et al. ........... 521/130

* cited by examiner

Primary Examiner—John M. Cooney, Jr.
(74) Attorney, Agent, or Firm—Terry T. Moyer; William S. Parks

(57) ABSTRACT

New, useful and surprisingly effective antiscorch compositions for utilization within polyurethane foam production methods which utilize very popular tertiary amine catalysts are provided. Such compositions require the presence of nominal yet effective amounts of organic cyclic ester materials. The ring systems of such materials appear to open during exposure to heat (during the curing process) and release carboxylic acids into the curing formulation. The tertiary amines become quenched by the carboxylic acids and thus do not exhibit heat destabilization. The resultant foams exhibit extremely low, if no, areas of excessive heating (i.e., scorch) and thus are substantially uniformly colored throughout. The processes and resultant foams are also contemplated within this invention.

7 Claims, No Drawings

POLYOL FORMULATIONS FOR PRODUCING ANTISCORCH POLYURETHANE SLABSTOCK FOAMS

CROSS REFERENCE TO RELATED APPLICATIONS

This application is a continuation of application Ser. No. 09/586,392, filed on Jun. 2, 2000 which is now U.S. Pat. No. 6,541,532. This parent application is herein entirely incorporated by reference.

FIELD OF THE INVENTION

This invention relates to surprisingly effective antiscorch compositions for utilization within polyurethane foam production methods which utilize very popular tertiary amine catalysts. Such compositions require the presence of nominal yet effective amounts of organic cyclic ester materials. The ring systems of such materials appear to open during exposure to heat (during the curing process) and release carboxylic acids into the curing formulation. The tertiary amines become quenched by the carboxylic acids and thus do not exhibit heat destabilization. The resultant foams exhibit extremely low, if no, areas of excessive heating (i.e., scorch) and thus are substantially uniformly colored throughout. The processes and resultant foams are also contemplated within this invention.

BACKGROUND OF PRIOR ART

Polyurethane products, such as foams, resins, and the like, have traditionally been colored by pigments, polymeric colorants, and dyes. Generally, these colorations are performed in situ during foam, resin, etc., formation. For instance, polymeric colorants (i.e., polyoxyalkylenated colorants), such as those described in U.S. Pat. No. 4,284,279 to Cross et al., have been introduced within polyol compositions during slabstock foam production. The "colored" polyol then reacts with an isocyanate composition, in the presence of a catalyst possibly, to form the desired colored foam. Pigments have also been added in the past, most notably in solid, paste, or powder form, to a polyol stream to form the same type of colored foam products. Such foamed products require the presence of at least one catalyst to effectuate the desired reaction between the polyol and isocyanate components. The most prevalent catalysts, due to cost in producing, using, and disposing, are tertiary amine-based compounds. These catalysts include hydroxyl terminated types, such as the most popular types used throughout the industry, DMEA (dimethyl ethanol amine), DABCO TL catalysts (blends of triethylene diamine and 2-[[2-(dimethylamino)ethyl]methylamino]ethanol), and Texacat ZF10 (N,N,N'-trimethyl-N'-hydroxyethyl-bis(aminoethyl) ether). These catalysts unfortunately present the ability to exaggerate certain problems within the resultant foams, most notably scorch discolorations and/or degradations. Scorching is a common occurrence within exothermic foam-producing reactions, particularly when air flow is minimized within the foam-making procedure. Apparently, such catalysts react readily with free isocyanate due to their reactive hydroxyls within the polyurethane and/or colorants and/or other additives present. In particular, such reactivity is pronounced due to the avoidance of CFC-type blowing agents (which dissipate heat during high temperature exothermic reactions upon use). As it is, the foam blowing agents now utilized throughout the industry are ineffective at dissipating the very high temperatures generated during the curing process. These high temperatures appear to oxidize the aromatic amines formed by reaction with free radicals and hydroperoxides generated during the curing process. Such compounds react readily with hard polyurethane segments within the foam product to for quinonoids which consequently cause color bodies to form. These resultant color bodies thus create discolorations within the final foam product since they are always of a different color than the desired foam product. Apparently, such high temperature discolorations and degradations more readily occur between about 30 and 60 minutes after foam generation (during gelation and blowing of the foam-producing composition) has taken place. During such exothermic oxidation reactions, the foam is then "burned" by the high temperatures thereby producing the highly undesirable discolored areas within the resultant foam article. Such scorching may also cause degradation of "burned" portions of foam to the extent that the affected areas exhibit much different physical properties than the unaffected foam. In such an instance, generally the scorched portions will become more brittle (and more prone to breaking or crushing) than the properly formed foam.

Attempts at alleviating these particular problems have included the addition of relatively expensive, potentially environmentally unfriendly, and potentially toxic antioxidants, such as 2,6-di-t-butyl-4-methylphenol (BHT), octadecyl-3-(3,5-di-t-butyl-4-hydroxyphenyl)propanoate (Irganox® 1076, from Ciba Geigy), and octyl-3(3,5-di-t-butyl-4-hydroxyphenyl)propanoate (Irganox® 1135), within the curing process. This has proven only marginally effective; however, again due to the expense and the large amount of such antioxidant compounds required, as well as the large amount remaining within the foam (which may be troublesome due to environmental and safety concerns), such a procedure is necessarily avoided if at all possible. Since there is a 15 to 30 minute window of opportunity to control high temperature exposures, some foam producers have practiced forced air cooling of the foam-producing composition in the past to reduce scorch problems. Unfortunately, however, the cost involved with providing the necessary degree of heavy air flow (particularly in a specific limited direction) is prohibitive. With both procedures, the costs involved have resulted in transferred costs to the foam purchaser and end user. Alternative methods, either simpler and less inexpensive in nature, have not been forthcoming within the industry. As a result, any marked improvements in such a manner are of utmost importance within the polyurethane foam production industry. To date, again, there have been no significant or helpful improvements nor advancements disclosed within the pertinent prior art.

OBJECTS OF THE INVENTION

It is therefore an object of this invention to provide a relatively inexpensive and simple method of providing antiscorch within polyurethane foam producing methods which utilize amine-based catalysts. A further object is to provide an easy-to-add liquid composition for introduction within polyurethane foam production procedures which effectively reduces and/or eliminates scorch problems associated with amine-based catalysts. A further objective of this invention is to provide a colored polyurethane foam product which exhibits substantially no scorch discolorations without the need for the addition of an appreciable amount of antioxidants or significantly increased airflow during foam production.

SUMMARY OF THE INVENTION

Accordingly, this invention is directed to a method of producing a polyurethane foam article comprising the steps of: a) providing a polyol composition; b) providing an isocyanate composition; c) adding a composition comprising at most 3.0 php of an organic cyclic ester to either or both of the compositions in steps "a" and "b", above; d) reacting all of the compositions from steps "a", "b", and "c" together in the presence of an tertiary amine-based catalyst. Also encompassed within this invention is the same method wherein at least one coloring agent (such as a pigment, polymeric colorant, dye, dyestuff, and the like) is added to any of the compositions within steps "a" and "b". The particular compositions from these steps including the organic cyclic ester and, optionally, at least one coloring agent, are also contemplated within this invention. Although a coloring agent is preferred in some embodiments, white foams also exhibit such problematic discolorations due to scorch. Surprisingly, the inventive utilization of organic cyclic esters in specific proportions provides the same improvements in discoloration for such non-colored foam products as well. Furthermore, an polyurethane foam article produced by these methods is also contemplated within this invention.

In general, polyurethane foam is produced through the catalyzed polymerization of the reaction products of polyols and isocyanates. Such a reaction is well known throughout the polyurethane industry and has practiced for many years. The potential number and types of polyols utilized within this invention are plentiful. Such a compound is defined as comprising at least two alcohol moieties, preferably at least three. The free hydroxyl groups react well with the isocyanates to form the urethane components which are then polymerized to form the desired polyurethanes. Blowing agents present within the polymerization step provide the necessary foam-making capability. Preferred polyols thus comprise between three and six alcohol moieties, comprising from between one and six carbon atoms per alcohol moiety. Most preferred is a standard ether triol, such as F3022 polyol, available from Lyondell.

Isocyanates, and more specifically, diisocyanates, are well known components of such polyurethane foams and include any compounds which possess at least one free cyanate reactive group. Preferably such compounds comprise more than one such free cyanate reactive group, most preferably two, however, greater numbers may be utilized as well. Such preferred diisocyanates are also either aliphatic or aromatic in nature. The most prominently utilized isocyanates, and thus the most preferred types for this invention, are toluene diisocyanate and methylene diisocyanate. Typically, the polyol is reacted with a small excess of isocyanate (ratio of from 1:1.04 to 1:1.2) in order to produce flexible foam products; higher excesses of isocyanate produce more rigid foams. In practice, two separate streams of liquids (one of polyol, the other of isocyanate) are mixed together in the presence of a gelation and blowing catalyst and a blowing agent in order to produce the desired polyurethane foam product.

The term "tertiary amine-based catalyst" is intended to encompass any polymerization/blowing catalyst utilized within polyurethane production which comprises at least one amine constituent. As noted above, amine-based catalysts, and more specifically, tertiary amine catalysts, are widely utilized within such specific foam-producing methods. Two catalysts, in particular, DABCO TL series and DMEA, are excellent polymerization catalysts for this purpose; however, they also appear to be extremely reactive in the presence of isocyanate groups. As noted above, oxidation initiated by the amine readily occurs upon exposure to high temperatures, thus resulting in the undesirable scorched foam portions. Although any amine presents such a potential reactivity (oxidation) problem, and thus is contemplated within the scope of this invention, it has been found that the highly reactive (hydroxyl terminated) tertiary amines present greater threats to discoloration and degradation to the final foam product. The amount of amine-based catalyst required to effectuate the desired urethane polymerization is extremely low, from between 0.05 php to about 1.00 php of the entire foam-making composition; more specifically, such a range is from about 0.07 php to about 0.60 php. Even though the number of free amines available are quite low, their ability to deleteriously affect the final foam product through oxidation of colorants, polyols, and other additives, is pronounced upon exposure to high temperature during polymerization.

Surprisingly, such scorching discolorations and degradations are substantially reduced and potentially eliminated through the simple extremely low addition of an organic cyclic ester within the foam-making procedure. Such a compound must be susceptible to ring opening upon exposure to the high foam-production temperatures and be thereafter be present as carboxylic acid within the same procedure. It is believed, without being bound to any specific scientific theory, that such carboxylic acids react more readily with the free reactive amines of the catalyst and thus quench the potential oxidation of other components of the foam-producing composition, all without affecting the rate of polymerization. Specific organic cyclic esters suitable for utilization for this purpose include, without limitation, lactones, cyclic carbonates, and basically any cyclic compound which exhibits ring opening upon exposure to heat of from about 50° C. to about 110° C.; more preferably from about 56° C. to about 95° C.; and most preferably from about 90° to about 94° C. Thereafter, the open ring structure exists as a carboxylic acid. Any mixtures of such compounds may be utilized as well. Of greater importance, however, appears to be necessity of introducing such a compound (or compounds) in relatively low amounts within the foam-making composition. Thus, such a compound is added within either the polyol stream in an amount of between 0.001 php and 3.0 php, in relation to the total polyol content. Preferably, this level is between about 0.20 and 3.0 php; more preferably between about 0.35 and about 2.5 php; and most preferably between about 0.55 and about 2.0 php. The preferred organic cyclic esters include caprolactone, gamma-valerolactone, sigma-valerolactone, butyrolactone, propylene carbonate, and any mixtures thereof. Most preferred are caprolactone and butyrolactone.

Coloring agents may be added within the different streams prior to reaction and/or polymerization as well. Such additions are well known within the industry to produce colored polyurethane foam articles in various colors and shades. Thus, the term "coloring agent" is intended to encompass any pigment, pigment dispersion, polymeric colorant, dye, dyestuff, any mixtures thereof, and the like, which provides desirable colorations to target polyurethane foam articles. In general, such coloring agents are added to the polyol stream (prior to reaction with the isocyanate) in amounts ranging from about 0.001 php to about 10 php. Higher color loadings may adversely affect foam performance. Suitable pigments for this invention include, without limitation, carbon black, lamp black, titanium dioxide, phthalocyanine, and the like. Suitable polymeric colorants for this purpose are disclosed within U.S. Pat. No. 4,284,279 to Cross et al., again without any limitation, and as merely examples. Suitable dyes and dyestuffs include azo, triphenylmethane, methine, benzothiazole, nitroso, and the like, chromophores.

Although colored foam is preferred, it is important to note that such a phenomenon works within uncolored foam as well since scorch problems occur upon the oxidation of aromatic amines within such uncolored products as well. Thus, a coloring agent is not necessary within the inventive non-scorch composition and/or ultimate foam article.

Other additives or solvents may also be present within the foam-making composition. Auxiliary blowing agents (to supplement the catalysts noted above) are required to provide the necessary foam blowing capability. Such compounds include methylene chloride, acetone, carbon dioxide, and the like, and are present in amounts of between about 1.0 php and 10 php of the entire foam-making composition. Water may also be added in relatively low amount (i.e., from about 1 to about 7 php; most preferably between about 3 and 5 php) to provide satisfactory blowing without fear of combustion. Silicones may be added to provide cell formation stabilization and are present in an amount from about 0.1 to about 5 php of the polyol content; preferably from about 1 to about 2 php.

The use of cyclic carbonates and cyclic lactones in polyurethane chemistry is known. U.S. Pat. No. 3,883,466 describes the use of a cyclic alkylene carbonate as a liquid modifier to moderate the reaction exotherm between the hydroxy component and the polyisocyanate in the production of a rigid, dense rapid-setting polyurethane. U.S. Pat. Nos. 4,709,002 and 4,731,427 describe the use of cyclic alkylene carbonates in the production of rigid RIM polyisocyanurate and urethane-modified polyisocyanurate parts. These two references do not indicate why cyclic alkylene carbonate is used but do suggest that the carbonate can be added to the isocyanate stream in order to reduce its viscosity. U.S. Pat. Nos. 5,028,635 and 5,149,458 report two polyurea-cyclic carbonate RIM systems having improved flow properties. European Patent 0,350,644 and U.S. Pat. No. 5,442,034 report similar applications for cyclic carbonate in RIM elastomers and spray polyurea elastomers, respectively. U.S. Pat. No. 4,812,523 describes high solids thermosetting coating composition with cyclic carbonates as reactive diluents to reduce viscosity. Cyclic carbonates and cyclic lactones have also been used as viscosity reducing agents in aromatic polyester polyols and polyether polyols (EP 0,276,452). There is no discussion or fair suggestion, however, of the addition of such extremely low amounts of organic cyclic esters for the purpose of quenching amine-based catalysts upon high temperature exposure during polyurethane foam-making procedures.

DESCRIPTION OF THE PREFERRED EMBODIMENT

A standard polyurethane foam article was first produced to investigate any scorch discolorations and/or degradations. Such a foam was produced through the reaction of the following components:

TABLE 1

| Component | Amount (php of the polyol content) |
|---|---|
| F3022 Polyol | 100 parts |
| Water | 5.3 |
| DABCO 33 LV (catalyst) | 0.31 |
| DABCO T1 (catalyst) | 0.48 |
| L520 Silicone (from ?) | 1.5 |
| Methylene Chloride | 5.4 |
| 82/20 toluene diisocyanate | 55 |

Upon mixture within a reaction vessel, the reaction created a "health" bubble (indicating satisfactory gelation and blowing balance), and the vessel was then exposed to 185° C. (generated within a microwave oven to simulate actual temperatures encountered on an industrial production level) for about 10 minutes. The resultant foam bun was then sliced in half and analyzed empirically. A clear area of discoloration within the center of the bun and extending about 4 inches in each direction was immediately noticed. Also, the same area exhibited a brittle foam possessing characteristics totally different from that of the properly colored foam portions. Such a foam would be considered off-quality and thus would require disposal.

Three more foam buns were produced with the same proportions and types of components as above. However, these further foam buns were produced with the extra addition of a) about 2.0 php of caprolactone, b) about 0.55 php of butyrolactone, and c) about 2.0 php of propylene carbonate. The resultant buns each exhibited marked improvements in color discoloration (no appreciable color differences were noted throughout the foam buns) and foam degradation (no brittleness was noted for any of the foam portions). Thus, these foams were acceptable.

Another set of runs was made to test reductions in discolorations and degradations. The base foam was produced with the following composition:

TABLE 2

| Component | Amount (php of the polyol content) |
|---|---|
| F3022 Polyol | 100 parts |
| Water | 4.53 |
| DABCO TL (catalyst) | 0.15 |
| DABCO T10 (catalyst) | 0.30 |
| L520 Silicone (from ?) | 1.0 |
| 82/20 toluene diisocyanate | 43.6 |
| REACTINT ® Black X77 | 1.0 |

Upon mixture within a reaction vessel, the reaction created a "health" bubble, and the vessel was then exposed to 185° C. (generated within a microwave oven to simulate actual temperatures encountered on an industrial production level) for about 10 minutes. The resultant foam bun was then sliced in half and analyzed empirically. A clear area of discoloration within the center of the bun and extending about 4 inches in each direction was immediately noticed. Also, the same area exhibited a brittle foam possessing characteristics totally different from that of the properly colored foam portions. Such a foam would be considered off-quality and thus would require disposal.

Three more foam buns were produced with the same proportions and types of components as above. However, these further foam buns were produced with the extra addition of a) about 2.0 php of caprolactone, b) about 0.55 php of butyrolactone, and c) about 2.0 php of propylene carbonate. The resultant buns each exhibited marked improvements in color discoloration (no appreciable color differences were noted throughout the foam buns) and foam degradation (no brittleness was noted for any of the foam portions). Thus, these foams were acceptable.

While the invention will be described and disclosed in connection with certain preferred embodiments and practices, it is in no way intended to limit the invention to those specific embodiments, rather it is intended to cover equivalent structures and all alternative embodiments and modifications as may be defined by the scope of the appended claims and equivalence thereto.

What we claim is:

1. A liquid composition comprising at least one polyol component and at least one lactone component selected from the group consisting of caprolactone, valerolactone, butyrolactone, and any mixtures thereof, wherein said at least one lactone component is present in an amount of from 0.001 php to about 3.0 php of said polyol component.

2. The liquid composition of claim 1 wherein said at least one lactone is caprolactone.

3. The liquid composition of claim 1 wherein said at least one lactone component is present in an amount from about 0.20 to about 3.0 php of said polyol component.

4. The liquid composition of claim 1 wherein said at least one lactone is butyrolactone.

5. The liquid composition of claim 3 wherein said at least one lactone component is present in an amount from about 0.35 to about 2.5 php of said polyol component.

6. The liquid composition of claim 2 wherein said caprolactone is present in an amount of about 2.0 php of said polyol component.

7. The liquid composition of claim 4 wherein said butyrolactone is present in an amount of about 0.55 php of said polyol component.

* * * * *